United States Patent
Rinck et al.

(10) Patent No.: US 7,715,609 B2
(45) Date of Patent: May 11, 2010

(54) METHOD FOR AUTOMATICALLY DETERMINING THE POSITION AND ORIENTATION OF THE LEFT VENTRICLE IN 3D IMAGE DATA RECORDS OF THE HEART

(75) Inventors: Daniel Rinck, Forchheim (DE); Michael Scheuering, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 1148 days.

(21) Appl. No.: 11/335,615

(22) Filed: Jan. 20, 2006

(65) Prior Publication Data

US 2006/0182341 A1 Aug. 17, 2006

(30) Foreign Application Priority Data

Jan. 21, 2005 (DE) .................. 10 2005 002 950

(51) Int. Cl.
*G06K 9/00* (2006.01)
*G06K 9/34* (2006.01)
*G06K 9/46* (2006.01)

(52) U.S. Cl. .................. 382/131; 382/173; 382/190

(58) Field of Classification Search ......... 382/128–132, 382/173–180, 171; 378/4, 8, 98.12, 901; 600/443, 447, 444, 449; 128/916
See application file for complete search history.

(56) References Cited

U.S. PATENT DOCUMENTS

| | | | | |
|---|---|---|---|---|
| 5,457,754 A | * | 10/1995 | Han et al. .................. | 382/128 |
| 5,680,471 A | * | 10/1997 | Kanebako et al. .......... | 382/128 |
| 5,903,664 A | * | 5/1999 | Hartley et al. ............. | 382/154 |
| 6,106,466 A | * | 8/2000 | Sheehan et al. ............ | 600/443 |
| 6,594,380 B2 | * | 7/2003 | Shinbata .................... | 382/132 |
| 6,628,743 B1 | * | 9/2003 | Drummond et al. ......... | 378/8 |

(Continued)

FOREIGN PATENT DOCUMENTS

WO WO 2004/003851 A2 1/2004

(Continued)

OTHER PUBLICATIONS

Automatic segmentation of the left ventricle and computation of diagnostic parameters using regiongrowing and a statistical model Dominik Fritz, Daniel Rinck, Roland Unterhinninghofen, Ruediger Dillmann, and Michael Scheuering, Proc. SPIE 5747, 1844 (2005).*

(Continued)

*Primary Examiner*—Wesley Tucker
*Assistant Examiner*—Andrae S Allison
(74) *Attorney, Agent, or Firm*—Harness, Dickey & Pierce, P.L.C.

(57) ABSTRACT

A method is disclosed for automatically determining the position and orientation of the left ventricle and/or adjacent regions in 3D image data records of the heart that have been recorded with the aid of an imaging, tomographic method after injection of contrast agent. In the method, the left ventricle is firstly coarsely segmented, and the long main axis is determined from the segmented image data. Starting from this long main axis, end points of a boundary line of the septum are determined in a plane by using search beams. The segmented image data, the long main axis and the end points fix the position and orientation of the left ventricle in the image data record.

16 Claims, 3 Drawing Sheets

U.S. PATENT DOCUMENTS

| | | | |
|---|---|---|---|
| 6,873,718 B2 * | 3/2005 | O'Donnell et al. | 382/131 |
| 2005/0004443 A1 * | 1/2005 | Okerlund et al. | 600/407 |
| 2005/0018890 A1 * | 1/2005 | McDonald et al. | 382/128 |
| 2005/0100203 A1 * | 5/2005 | Fujisawa | 382/130 |

FOREIGN PATENT DOCUMENTS

WO    WO 2004/107273 A1    12/2004

OTHER PUBLICATIONS

H. C. van Assen, M. G. Danilouchkine, F. Behloul, H. J. Lamb, R. J. van der Geest, J. H. C. Reiber, and B. P. F. Lelieveldt, "Cardiac LV segmentation using a 3D active shape model driven by fuzzy inference," in Proc. of MICCAI 2003, pp. 533-540, Springer Verlag, 2003.*

T.F.Cootes, C.J.Taylor: "Statistical Models of Appearance for Computer Vision", 2000, S. 1-96.

* cited by examiner

METHOD FOR AUTOMATICALLY DETERMINING THE POSITION AND ORIENTATION OF THE LEFT VENTRICLE IN 3D IMAGE DATA RECORDS OF THE HEART

The present application hereby claims priority under 35 U.S.C. §119 on German patent application number DE 10 2005 002 950.7 filed Jan. 21, 2005, the entire contents of which is hereby incorporated herein by reference.

FIELD

The present invention generally relates to a method for automatically determining the position and/or orientation of the left ventricle and/or adjacent regions in 3D image data records of the heart as the latter have been recorded with the aid of an imaging, tomographic method, in particular computed tomography, after injection of contrast agent.

BACKGROUND

In addition to the visualization, already previously carried out, of coronary heart diseases, modern techniques of computed tomography, in particular multi-slice computed tomography, also enable a visualisation of the heart for a functional analysis. Here, the recording of the 3D image data of the heart is performed after a contrast agent injection, in order to be able to distinguish regions supplied with blood and therefore enriched with contrast agent, clearly from structures not supplied with blood.

An essential precondition for the functional cardio analysis with the aid of 3D image data of a tomographic modality is a suitable visualization of the image data, in which the viewer can at any time detect and/or interrogate the precise position of an arbitrary point in the heart that he has marked in the image. Above all, this requires a correct delimitation between the left ventricle, the right ventricle and the myocardium.

Such a delimitation requires a segmentation of the 3D image data into the individual regions of the heart. Recently, use has increasingly been made for this purpose of model based methods, for example those based on the so called "Active Shape Model" (ASM) or the so-called "Point Distribution Model" (PDM). Details on these models, which are built on the basis of training data and adapted to the existing 3D image data, are to be found, for example, in T. Cootes et al., "Statistical Models of Appearance for Computer Vision", University of Manchester, Dec. 5, 2000, the entire contents of which is hereby incorporated herein by reference.

However, a segmentation of the left ventricle and of structures of the myocardium in 3D image data of the heart has so far been possible with the aid of such a model only through time consuming manual interaction with the user. Assigning the individual regions of the heart in accordance with a segment model such as the 17 segment model of the American Heart Association (AHA segment model) has also so far required manual interaction with the user. During this manual interaction, the user has had to mark in the images displayed boundary points of the septum on the basis of which it has been possible to assign the segment model in conjunction with the already segmented image data. Such a segment model divides the heart into basal, mid-ventricular and apically defined regions to which reference is respectively made by specialists when describing the heart.

SUMMARY

An object of at least one embodiment of the present invention resides in specifying a method for determining the position and orientation of the left ventricle and/or adjacent regions in 3D image data records of the heart, in the case of which the determination can be performed automatically without time consuming interaction with the user.

An object may be achieved with the aid of a method. Advantageous refinements of the method can be gathered from the following description and the example embodiment.

In the method of at least one embodiment, a 3D image data record, in particular a CT image data record, of the heart is prepared which has been recorded with the aid of an imaging tomographic method after injection of contrast agent. In the 3D image data record, the left ventricle is firstly at least coarsely segmented with the aid of an image processing algorithm, and a long main axis of the left ventricle is determined from the segmented image data. Starting from the main axis, the two end points of a boundary line of the septum are detected with the aid of radial search beams in at least one plane perpendicular to the main axis. This detection can be performed in a completely automated fashion via a pressure value method. The position and orientation of the left ventricle are then fixed on the basis of the coarsely segmented image data, the known long main axis and the position of the detected end points.

This fixed position and orientation of the left ventricle is preferably used to assign a segment model, in particular the AHA segment model, to the 3D image data or image data segmented therefrom. The viewer can then obtain information on the assigned segment in accordance with the segment model by clicking on or marking a corresponding point or region within the respectively displayed image.

In a further, very advantageous development of the method of at least one embodiment, the coarse segmentation is refined by adapting to the 3D image data, a model whose starting parameters, that is to say the starting position, scaling and rotary orientation about the main axis, are obtained from the data already present, that is to say the position of the main axis, the end points of the boundary line of the septum and the coarse segmentation of the left ventricle. A time consuming manual interaction with the user in order to adapt the model is thereby avoided.

In an advantageous refinement of at least one embodiment, the user simply clicks on the aorta in a pictorial illustration of the heart to set a starting point from which the further steps of the method of at least one embodiment are performed in an entirely automated fashion. After determination of the position and orientation of the left ventricle and/or adjacent regions in the 3D image data record, in accordance with the method of at least one embodiment, the user can display any desired pictorial illustration and is informed at any time of the exact location of the individual image areas displayed. This then enables functional cardio analysis on the basis of tomographic 3D image data, in particular CT image data, without prior time consuming user interaction.

BRIEF DESCRIPTION OF THE DRAWINGS

The method is explained in more detail again below with the aid of an example embodiment in conjunction with the drawings and without limiting the scope of protection prescribed by the patent claims. In the drawings:

DETAILED DESCRIPTION OF THE EXAMPLE EMBODIMENTS

Figure 1:
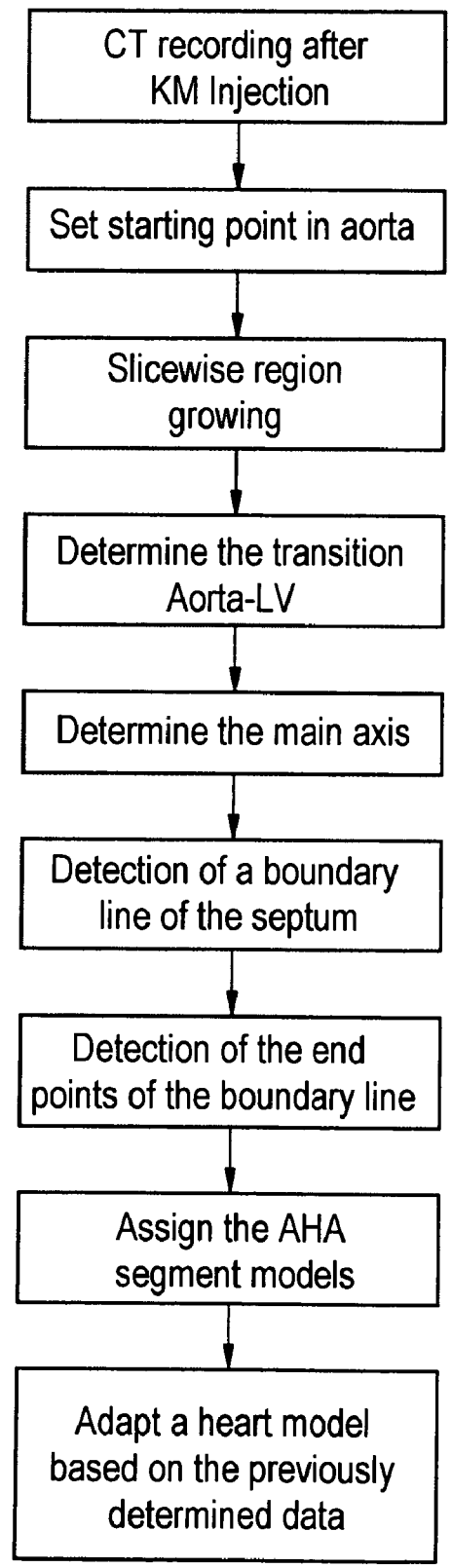
FIG. 1 shows an example of individual method steps in carrying out the method of at least one embodiment.

An example of individual method steps in carrying out the method of at least one embodiment is illustrated in FIG. 1. The individual method steps are explained again in more detail below. Firstly, a 3D image data record of the heart that has been recorded with the aid of a computed tomography unit after injection of contrast agent is provided. The aim here is to segment the image data for a functional cardio analysis by adapting the ASM, which describes the epicardial and endocardial surfaces, to the 3D image data record.

To determine the starting parameters for the adaptation of the model automatically, use is made of an algorithm which requires for starting merely a click of the user on a point in the upper area of the aorta in a pictorial illustration of the 3D image data record. Starting from the image point marked in this way, a mean intensity within a prescribed area about this marked point is calculated in a first slice of the 3D image data record. Subsequently, a region growing algorithm is started which checks all the respectively adjacent voxels in this slice as to whether they lie in a prescribed threshold value interval about this mean intensity value.

Figure 2:
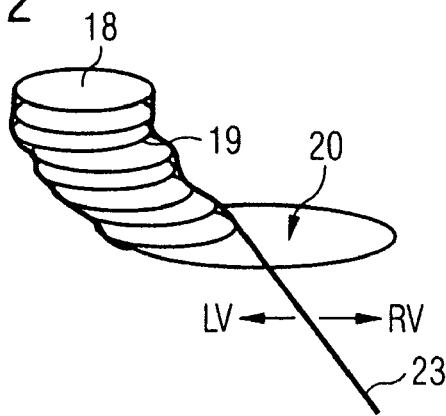
FIG. 2 shows an example of the region growing algorithm for the segmentation of the aorta.

All the voxels that lie within the interval are counted as belonging to the aorta and correspondingly masked. The same process is performed for the next slice, respectively lying therebelow, this time the mean intensity value being calculated from the mean intensity of the voxels masked in the previous slice. This slicewise carrying out of the region growing algorithm is illustrated schematically in FIG. 2, which schematically shows the aorta 18 and the individual slices 19 that are run through sequentially in the region growing algorithm.

In order to avoid uncontrolled rampant growth in the heart as a whole, growth barriers are set for the region growing algorithm. This is performed in the present example by virtue of the fact that in each case a rectangular area is set around each marked voxel and checked as to whether a minimum number of voxels are masked in this surrounded area. If this is not the case, this area is subtracted from the mask. If this is the case, it is added to the mask. Undesired outgrowths during region growing can be avoided in this way. A mask of the aorta, the left ventricle and parts of the right ventricle, and the left and right atriums is obtained as a result of the region growing algorithm used here.

A slicewise analysis of the image data is performed in order to detect the plane of the cardiac valve. For this purpose, the centroid of the masked voxel surface is determined in each slice which runs through in the region growing algorithm. Upon transition from the aorta into the left ventricle, there is a strong lateral displacement of this centroid which can be determined from the segmented image data. This jump of the centroid therefore fixes the end of the aorta in the image data record. Also, the number of the voxels belonging to the masked surface rises abruptly at this point. Consequently, the transition from the aorta into the left ventricle can be determined automatically in the 3D image data with the aid of this analysis.

Since the region growing algorithm can also run into the right ventricle, this must be detected, and the right ventricle must be appropriately isolated in the image data. This case can be detected on the basis of a renewed jump of the centroid after the end of the aorta. If such a jump occurs, this is an indication that the algorithm has also run into the right ventricle.

Figure 3:
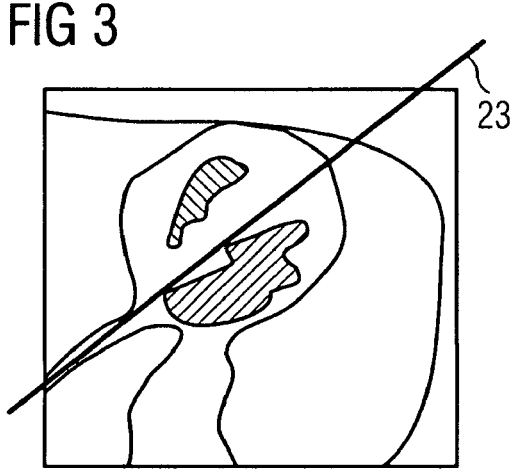
FIG. 3 shows an example of the separation between left and right ventricles.

In this case, a separating line 23 between the left ventricle (LV) and the right ventricle (RV) is set in the illustration of the slice in which this renewed jump has been detected. This is illustrated in FIG. 3.

The positioning of this separating line 23 is performed in such a way that the surface masked in the preceding slice is precisely not cut by the line. The orientation of the line can be obtained from the additional information relating to the 3D image data that is present in DICOM format. The orientation of the patient in the recorded image that also fixes the orientation of the separating line is known from these image data. All the voxels above the separating line 23 (compare FIG. 3) are cut off and not used for the masking.

The result of the preceding method steps is a binary mask of the left ventricle on the basis of which the orientation and scaling of the ASM can be determined as starter parameters.

However, the scaling and positioning do not yet suffice for a quick and accurate adaptation of the model. The rotation about the main axis is not yet fixed thereby, and likewise also has to be determined. This is not performed in the method of at least one embodiment by manually fixing the corresponding delimiting points of the septum. Rather, these points are determined automatically in the following way.

Figure 4:
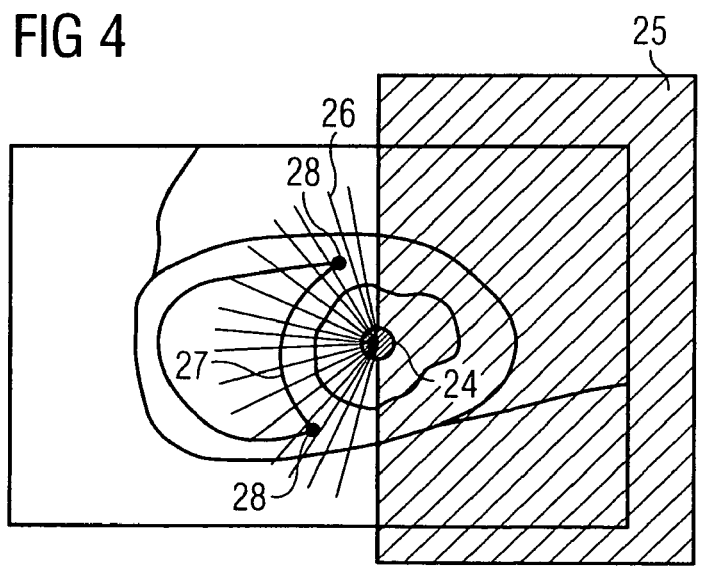
FIG. 4 shows an illustration of the detection of the end points of a boundary line of the septum.

The long main axis 24 is known from the above component analysis of the left ventricle. Furthermore, the orientation of the patient is known from the DICOM information and can be used to exclude the right-hand area 25 in the pictorial illustration shown in FIG. 4 when searching for the septum. The search is performed only in the left-hand hemisphere.

To this end, search beams 26 are drawn from the known main axis 24 in the radial direction in this slice through the image data. The boundary line 27 of the septum can be detected by analysing the gradients between respectively adjacent voxels along the respective search beams 26. To this end, it is only gradients which lie above a prescribable threshold value that are searched for.

Mathematical curve fitting can be performed in addition in order to adapt this boundary line 27. The boundary line is detected and smoothed in this way. Interest attaches only to those end points 28 of this boundary line 27 for which the gradients fall below the threshold value. These end points 28 are used to fix the rotary orientation of the left ventricle about the main axis. The AHA segment model can then be assigned to the 3D image data from knowledge of these end points 28.

Figure 5:
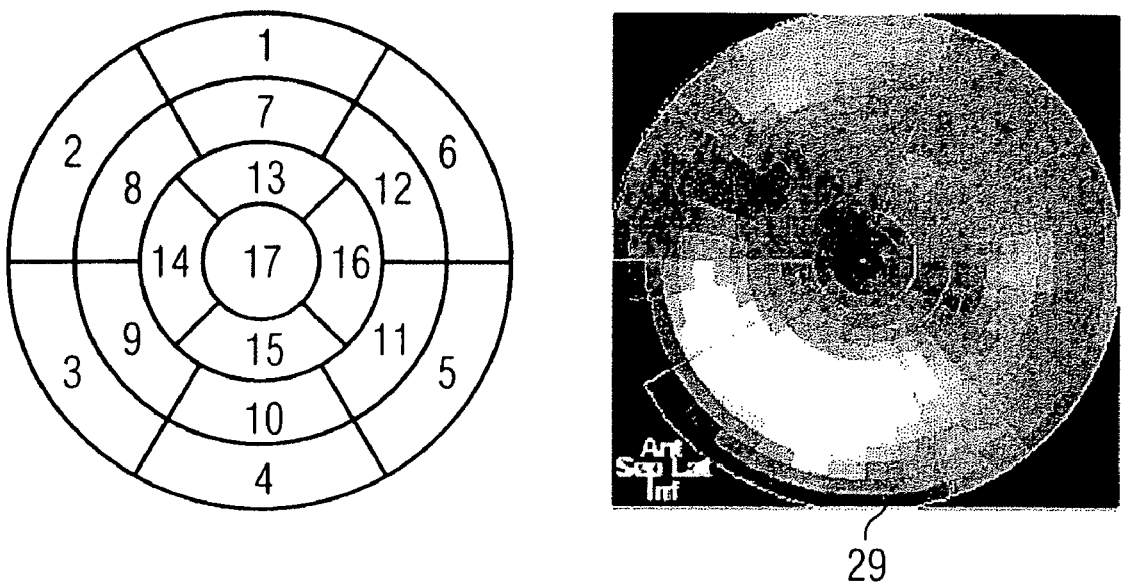
FIG. 5 shows an example of the AHA segment model, and a polar map illustration of the image data.

The model is illustrated in the left-hand part of FIG. 5. The right-hand part of FIG. 5 shows a polar map illustration 29 (also termed "Bull Eyes Projection") of the image data of the heart which represents a view corresponding to the AHA segment model. Such a polar map illustration can be prompted by the user and generated straight away from the 3D image data.

Figure 6:
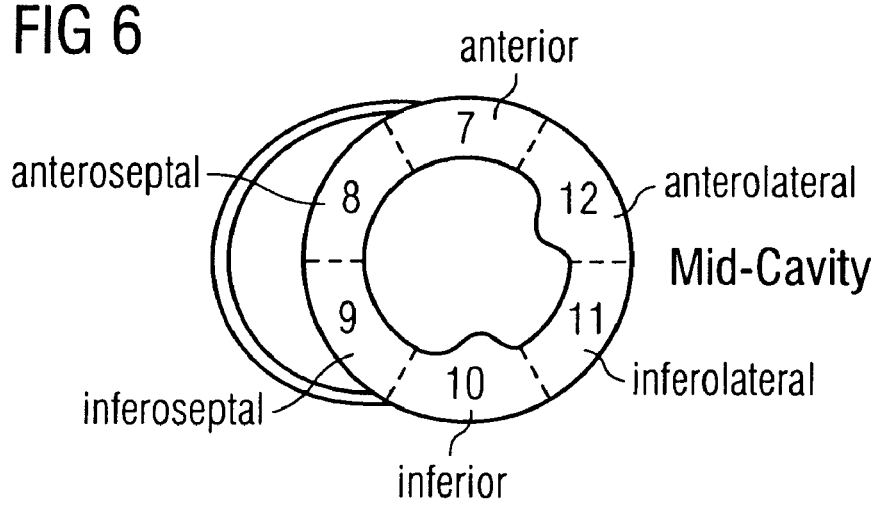
FIG. 6 shows an illustration of the end points of a boundary line of the septum in the mid-ventricular plane.

Finally, FIG. 6 shows a further pictorial illustration of a slice in the mid-ventricular region of the heart in which the individual segments according to the segment model, and the end points 28 of the boundary line of the septum are illustrated.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for automatically determining position and orientation of at least a left ventricle in 3D image data records of a heart, the method comprising:
preparing, with the aid of a computed tomography unit, a 3D image data record of the heart;
coarsely segmenting at least the left ventricle with the aid of an image processing algorithm in the 3D image data record, and determining a long main axis of the left ventricle from the segmented image data;
detecting end points of a boundary line of the septum, starting from the long main axis with radial search beams, starting from the long main axis; and
determining the position and orientation of the left ventricle on the basis of the segmented image data, the long main axis and the end point; wherein
the coarse segmentation of the left ventricle is refined by adapting a model;
a starting position and initial scaling are determined as starting parameters for the adaptation of the model by a preprocessing in which a transition from the aorta into the left ventricle is detected on the basis of a region growing algorithm, starting from an arbitrary, prescribable starting point in the aorta, and the left ventricle is delimited from the right ventricle; and
the coarsely segmenting, the detecting and the determining are performed by a processor.

2. The method as claimed in claim 1, wherein a segment model of the left ventricle is assigned on the basis of at least one of the segmented image data, the long main axis and the end points of the 3D image data and image data segmented therefrom.

3. The method as claimed in claim 1, wherein the region growing algorithm is carried out starting from the starting point of a slicewise segmentation, a centroid of the masked surface being determined in the data of each slice that are masked by the segmentation, and the transition from the aorta into the left ventricle being detected by way of a sudden displacement of the centroid from one slice to a following slice.

4. The method as claimed in claim 1, wherein the end points are used to determine an initial rotary position of the model about the main axis as a further starting parameter for adapting the model.

5. The method as claimed in claim 1, wherein the boundary line of the septum is determined via a gradient threshold value method.

6. The method as claimed in claim 1, wherein the coarse segmentation of the left ventricle is refined by adapting a surface model.

7. The method as claimed in claim 2, wherein the boundary line of the septum is determined via a gradient threshold value method.

8. The method as claimed in claim 1, wherein the 3D image data record of the heart is one recorded with the aid of a tomographic imaging method.

9. The method as claimed in claim 1, wherein the 3D image data record of the heart is one recorded with the aid of a tomographic imaging method after injection of contrast agent.

10. A method for determining position and orientation of at least a left ventricle of a heart from a 3D image data record of the heart, the method comprising:
determining a long main axis of the left ventricle from coarsely segmented image data;
detecting end points of a boundary line of the septum starting from the long main axis, using radial search beams starting from the long main axis; and
determining the position and orientation of the left ventricle on the basis of the segmented image data, the long main axis and the end points; wherein
the coarse segmentation of the left ventricle is refined by adapting a model;
a starting position and initial scaling are determined as starting parameters for the adaptation of the model by a preprocessing in which a transition from the aorta into the left ventricle is detected on the basis of a region growing algorithm, starting from an arbitrary, prescribable starting point in the aorta, and the left ventricle is delimited from the right ventricle; and
the determining of the long main axis, the detecting of the endpoints and the determining of the position and orientation of the left ventricle are performed by a processor.

11. The method as claimed in claim 10, wherein a segment model of the left ventricle is assigned on the basis of at least one of the segmented image data, the long main axis and the end points of the 3D image data and image data segmented therefrom.

12. The method as claimed in claim 10, wherein the region growing algorithm is carried out starting from the starting point of a slicewise segmentation, a centroid of the masked surface being determined in the data of each slice that are masked by the segmentation, and the transition from the aorta into the left ventricle being detected by way of a sudden displacement of the centroid from one slice to a following slice.

13. The method as claimed in claim 10, wherein the boundary line of the septum is determined via a gradient threshold value method.

14. The method as claimed in claim 10, wherein the coarse segmentation of the left ventricle is refined by adapting a surface model.

15. The method as claimed in claim 11, wherein the coarse segmentation of the left ventricle is refined by adapting a surface model.

16. The method as claimed in claim 10, wherein the end points are used to determine an initial rotary position of the model about the main axis as a further starting parameter for adapting the model.

* * * * *